(12) United States Patent
Pasqualini

(10) Patent No.: US 7,185,042 B1
(45) Date of Patent: Feb. 27, 2007

(54) HIGH SPEED, UNIVERSAL POLARITY FULL ADDER WHICH CONSUMES MINIMAL POWER AND MINIMAL AREA

(75) Inventor: Ronald Pasqualini, Los Altos, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 472 days.

(21) Appl. No.: 10/014,287

(22) Filed: Nov. 9, 2001

(51) Int. Cl.
*G06F 7/50* (2006.01)

(52) U.S. Cl. ...................... 708/702; 708/703

(58) Field of Classification Search ............... 708/702, 708/703
See application file for complete search history.

(56) References Cited

U.S. PATENT DOCUMENTS

| | | | | |
|---|---|---|---|---|
| 4,564,921 A | * | 1/1986 | Suganuma | 708/702 |
| 4,709,346 A | * | 11/1987 | Henlin | 708/702 |
| 4,713,790 A | * | 12/1987 | Kloker et al. | 708/702 |
| 4,831,578 A | * | 5/1989 | Bui | 708/703 |
| 4,866,658 A | * | 9/1989 | Mazin et al. | 708/702 |
| 4,920,509 A | * | 4/1990 | Hmida et al. | 708/702 |
| 5,875,124 A | * | 2/1999 | Takahashi | 708/702 |

* cited by examiner

*Primary Examiner*—Tan V. Mai
(74) *Attorney, Agent, or Firm*—Mark C. Pickering

(57) ABSTRACT

A low power, high speed full adder cell is described. This cell supports all possible combinations of active high/active low input/output signal polarity (32 different combinations), without adding extra inverters or extra transistors. The cell makes liberal use of complementary metal oxide semiconductor (CMOS) transmission gates in order to minimize the number of transistors used, and to minimize their stacking. This significantly decreases the total transistor gate area consumed, resulting in minimal power dissipation and minimal cell size.

23 Claims, 12 Drawing Sheets

US 7,185,042 B1

HIGH SPEED, UNIVERSAL POLARITY FULL ADDER WHICH CONSUMES MINIMAL POWER AND MINIMAL AREA

BACKGROUND OF THE INVENTION

1. Field of the Invention

The present invention relates to a full adder and, more particularly, to a high speed, universal polarity full adder which consumes minimal power and minimal area.

2. Description of the Related Art

Many applications require the use of high speed full adders which are low in power, small in size, and flexible with respect to the polarity (active high/active low) of their input/output signals. FIG. 1 shows the schematic diagram of a prior-art, transistor-based full adder cell 100.

Referring to FIG. 1, it can be seen that full adder cell 100 includes two complex gates and two inverters: a first complex gate 110, a second complex gate 112, a first inverter 114 and a second inverter 116. First complex gate 110, which contains 10 transistors M0–M9, receives a first input signal A, a second input signal B, and a carry input signal CI. In addition, gate 110 also generates a first gate signal FG on node NODE1.

Second complex gate 112, which contains 14 transistors M10–M23, also receives input signal A, input signal B, and carry input signal CI. In addition, gate 112 also receives the first gate signal FG from NODE1, and generates a second gate signal SG on node NODE2.

First inverter 114, which contains two transistors M24/M25, receives the second gate signal SG from NODE2, and generates a sum output signal S. Second inverter 116, which contains two transistors M26/M27, receives the first gate signal FG from NODE1, and generates a carry output signal CO.

In operation, the sum output signal S is high when only input signal A is high, or when only input signal B is high, or when only input signal CI is high, or when input signals A, B and CI are all high.

Referring to FIG. 1, when only input signal A is high, transistors M1, M2, M3, M6 and M7 are turned on, while transistors M0, M4, M5, M8 and M9 are turned off. This forces the first gate signal FG high, driving NODE1 high.

The logic high on NODE1 turns on transistor M17 and turns off transistor M13. Thus transistors M11, M12, M14, M16, M17, M18 and M22 are turned on, while transistors M10, M13, M15, M19, M20, M21 and M23 are turned off. This forces the second gate signal SG low, driving NODE2 low. Transistors M24 and M25 then invert the logic low on NODE2, generating a logic high on the sum output signal S.

Referring to FIG. 1, when only input signal B is high, transistors M0, M3, M4, M8 and M9 are turned on, while transistors M1, M2, M5, M6 and M7 are turned off. This forces the first gate signal FG high, driving NODE1 high.

The logic high on NODE1 turns on transistor M17 and turns off transistor M13. Thus transistors M10, M12, M15, M16, M17, M19 and M23 are turned on, while transistors M11, M13, M14, M18, M20, M21 and M22 are turned off. This forces the second gate signal SG low, driving NODE2 low. Transistors M24 and M25 then invert the logic low on NODE2, generating a logic high on the sum output signal S.

Referring to FIG. 1, when only input signal CI is high, transistors M0, M1, M2, M4 and M5 are turned on, while transistors M3, M6, M7, M8 and M9 are turned off. This forces the first gate signal FG high, driving NODE1 high.

The logic high on NODE1 turns on transistor M17 and turns off transistor M13. Thus transistors M10, M11, M14, M15, M17, M20 and M21 are turned on, while transistors M12, M13, M16, M18, M19, M22 and M23 are turned off. This forces the second gate signal SG low, driving NODE2 low. Transistors M24 and M25 then invert the logic low on NODE2, generating a logic high on the sum output signal S.

Referring to FIG. 1, when input signals A, B and CI are all high, transistors M5–M9 are turned on, while transistors M0–M4 are turned off. This forces the first gate signal FG low, driving NODE1 low.

The logic low on NODE1 turns on transistor M13 and turns off transistor M17. Thus transistors M13, M18, M19, M20, M21, M22 and M23 are turned on, while transistors M10, M11, M12, M14, M15, M16 and M17 are turned off. This forces the second gate signal SG low, driving NODE2 low. Transistors M24 and M25 then invert the logic low on NODE2, generating a logic high on the sum output signal S.

The carry output signal CO is high when only input signals A and B are high, or when only input signals A and CI are high, or when only input signals B and CI are high, or when input signals A, B and CI are all high.

Referring to FIG. 1, when only input signals A and B are high, transistors M3, M6, M7, M8 and M9 are turned on, while transistors M0, M1, M2, M4 and M5 are turned off. This forces the first gate signal FG low, driving NODE1 low. Inverter 116, formed by transistors M26 and M27, then inverts the logic low on NODE1, generating a logic high on the carry output signal CO.

Similarly, when only input signals A and CI are high, transistors M1, M2, M5, M6 and M7 are turned on, while transistors M0, M3, M4, M8 and M9 are turned off. This forces the first gate signal FG low, driving NODE1 low. Inverter 116, formed by transistors M26 and M27, then inverts the logic low on NODE1, generating a logic high on the carry output signal CO.

Furthermore, when only input signals B and CI are high, transistors M0, M4, M5, M8 and M9 are turned on, while transistors M1, M2, M3, M6 and M7 are turned off. This forces the first gate signal FG low, driving NODE1 low. Inverter 116, formed by transistors M26 and M27, then inverts the logic low on NODE1, generating a logic high on the carry output signal CO.

Finally, when input signals A, B and CI are all high, transistors M5–M9 are turned on, while transistors M0–M4 are turned off. This forces the first gate signal FG low, driving NODE1 low. Inverter 116, formed by transistors M26 and M27, then inverts the logic low on NODE1, generating a logic high on the carry output signal CO.

TABLE 1 shows the truth table for a full adder. Referring to TABLE 1, the full adder inputs include input signal A, input signal B and the carry input signal CI. The full adder outputs include sum output signal S and the carry output signal CO. As shown in TABLE 1, sum output signal S and carry output signal CO both depend upon the adder input signals A, B and CI.

Using the data shown in TABLE 1, the Boolean logic equation for the sum output signal S can be easily obtained by constructing a simple Karnaugh map, as shown in TABLE 2 and Eq. 1. Referring to Eq. 1, it can be seen that the sum output signal S will be high only when there are an odd number of ones in the triad {A, B, CI}. Thus, the sum output signal S will be high when only input signal A is high, or when only input signal B is high, or when only input signal CI is high, or when input signals A, B and CI are all high.

Using the data shown in TABLE 1, the Boolean logic equation for the carry output signal CO can be easily obtained by constructing a simple Karnaugh map, as shown in TABLE 3 and Eq. 2. Referring to Eq. 2, it can be seen that the carry output signal CO will be high when at least two of the members in the triad {A, B, CI} are high. Therefore, the carry output signal CO will be high when input signals A and B are high, or when input signals A and CI are high, or when input signals B and CI are high.

TABLE 1

| Input A | Input B | Input CI | Output S | Output CO |
|---------|---------|----------|----------|-----------|
| 0 | 0 | 0 | 0 | 0 |
| 0 | 0 | 1 | 1 | 0 |
| 0 | 1 | 0 | 1 | 0 |
| 0 | 1 | 1 | 0 | 1 |
| 1 | 0 | 0 | 1 | 0 |
| 1 | 0 | 1 | 0 | 1 |
| 1 | 1 | 0 | 0 | 1 |
| 1 | 1 | 1 | 1 | 1 |

TABLE 2

| AB / CI | 00 | 01 | 11 | 10 |
|---------|----|----|----|----|
| 0 |    | 1  |    | 1  |
| 1 | 1  |    | 1  |    |

$$S = \overline{AB}CI + A\overline{B}\overline{CI} + \overline{A}B\overline{CI} + ABCI \qquad \text{Eq. 1}$$

TABLE 3

| AB / CI | 00 | 01 | 11 | 10 |
|---------|----|----|----|----|
| 0 |    |    | 1  |    |
| 1 |    | 1  | 1  | 1  |

$$CO = AB + ACI + BCI \qquad \text{Eq. 2}$$

The prior-art full adder shown in FIG. 1 suffers from several disadvantages. For example, full adder 100 contains 28 transistors, a very high device count. Furthermore, except for two inverters, the transistors in full adder 100 are stacked up to three high, resulting in large device sizes. The high device count and the high device stacking are serious disadvantages because they increase the total gate capacitance, the total power dissipation and the total cell area.

Another disadvantage of full adder 100 is that its input/output signal polarity cannot be changed without adding inverters at the inputs/outputs of the adder. Thus, for applications which require different input/output signal polarity, the addition of these inverters increases the total gate capacitance, the total power dissipation and the total cell area. Since a full adder has three inputs and two outputs, each of which can be active high or active low, there are 32 different combinations of input/output signal polarity.

From the foregoing discussion, it can be seen that there is a definite need for a high speed full adder which is low in power and small in size. Furthermore, this adder should support all possible combinations of input/output signal polarity, without requiring extra inverters. Additionally, this adder should also provide buffered or unbuffered outputs, in order to drive high/low capacitance loads.

SUMMARY OF THE INVENTION

An adder cell in accordance with the present invention includes a logic gate which has a first input that receives a first input signal, a second input that receives a second input signal, and a first output that generates a first logic signal. The logic gate generates the first logic signal in response to the logic states of the first and second input signals. The logic gate also generates an inverted first input signal in response to the first input signal.

The adder cell also includes an inverter circuit which has a third input that receives a third input signal, a fourth input connected to receive the first logic signal, a first output that generates an inverted third signal, and a second output that generates an inverted first logic signal.

The adder cell further includes a carry output circuit which has a first control input connected to receive the logic signal, a second control input connected to receive the inverted first logic signal, and an output. The adder cell additionally includes a sum output circuit which has a first control input connected to receive the first logic signal, and a second control input connected to receive the inverted first logic signal. The sum output circuit also has a first sum input connected to the third input signal, a second sum input connected to the inverted third signal, and an output.

A better understanding of the features and advantages of the present invention will be obtained by reference to the following detailed description and accompanying drawings, which set forth an illustrative embodiment in which the principles of the invention are utilized

DETAILED DESCRIPTION

Figure 1:
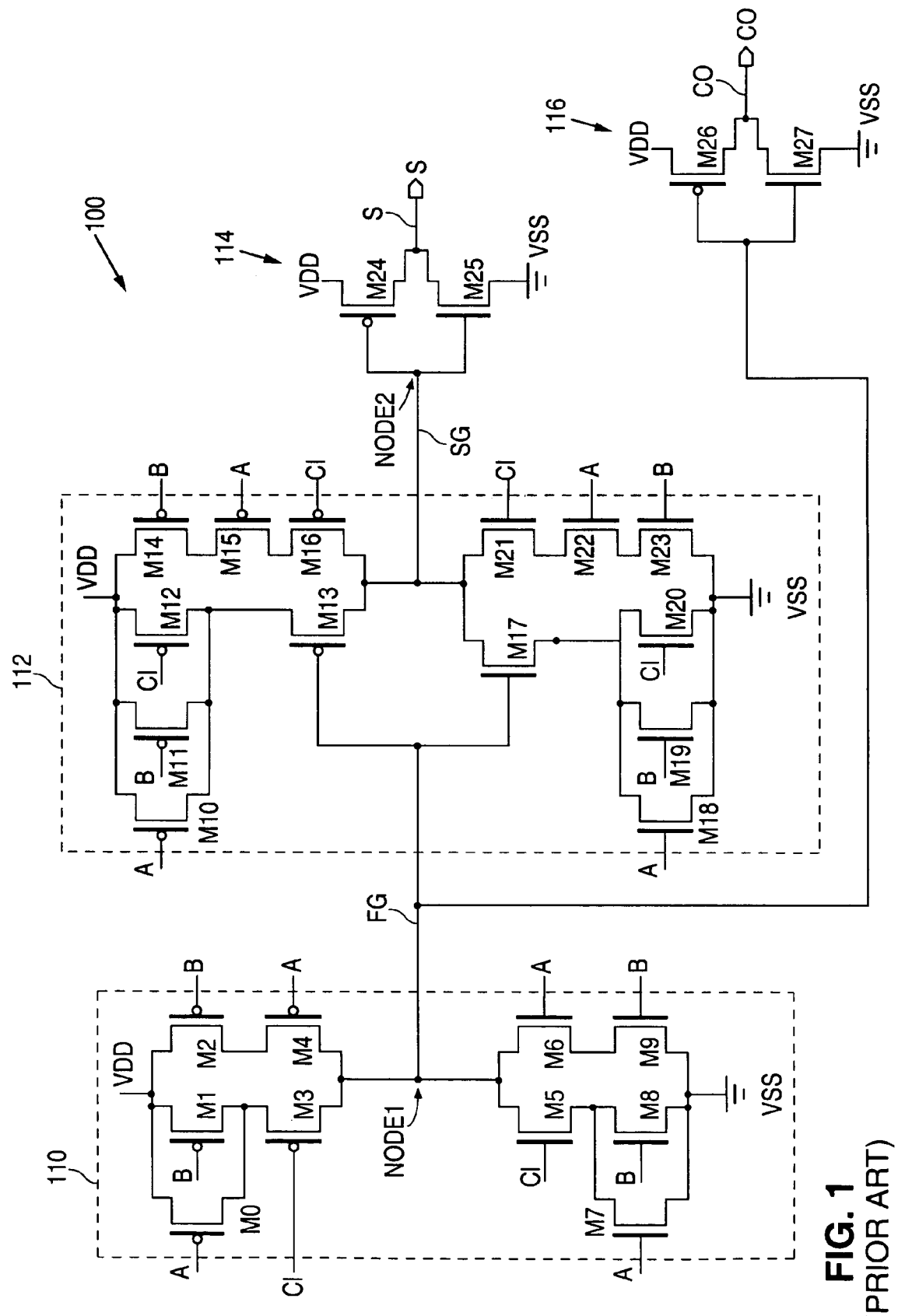
FIG. 1 is a schematic diagram illustrating a prior-art, transistor-based implementation of a full adder cell 100.
Figure 2:
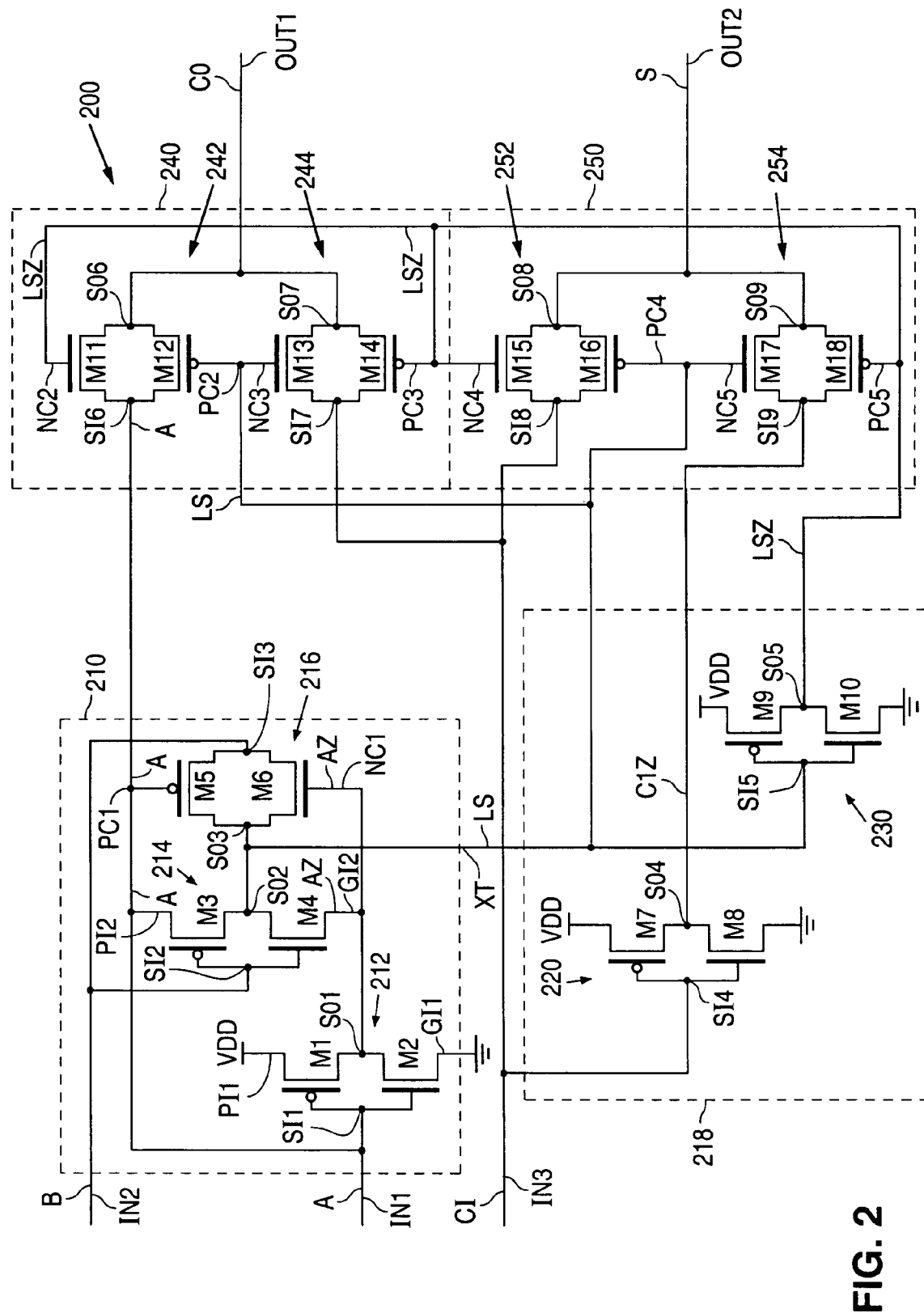
FIG. 2 is a schematic diagram illustrating a full adder cell 200 in accordance with the present invention.

In accordance with the present invention, FIG. 2 shows a schematic diagram illustrating a full adder cell 200. Full adder cell 200 has three inputs and two outputs. The three inputs include an adder input IN1 which receives a first input signal A, an adder input IN2 which receives a second input signal B, and an adder input IN3 which receives a third input signal CI. In addition, the two adder outputs include an output OUT1 which generates a carry output signal CO, and an output OUT2 which generates a sum output signal S.

As shown in FIG. 2, full adder cell 200 also includes an exclusive OR (XOR) gate 210 which has an output XT, a first input connected to adder input IN1, and a second input connected to adder input IN2. XOR gate 210 performs the XOR function based upon the logic states of input signals A and B on adder inputs IN1 and IN2. Thus XOR gate 210 generates an output signal LS on output XT in response to its A and B input signals.

Referring to FIG. 2, XOR gate 210 includes a first inverter 212, a second inverter 214, and a transmission gate 216. Inverter 212 has an input node SI1 connected to adder input IN1 and an output node SO1. Inverter 212 also contains a third node PI1 connected to a power supply VDD and a fourth node GI1 connected to ground. Inverter 212 receives input signal A and generates an inverted logic signal AZ.

Inverter 214 has an input node SI2 connected to adder input IN2, and an output node SO2 connected to output XT. Furthermore, inverter 214 also contains a PI2 node connected to adder input IN1, and a GI2 node connected to the SO1 output of inverter 212.

Transmission gate 216 has an input node SI3 connected to adder input IN2, and an output node SO3 connected to output XT. Furthermore, transmission gate 216 also contains a PC1 node connected to adder input IN1, and an NC1 node connected to the SO1 output node of inverter 212.

In addition to gate 210, full adder cell 200 also includes an inverter circuit 218 which includes a carry input inverter 220 and a gate inverter 230. Inverter 220 has an output node SO4 and an input node SI4 connected to adder input IN3. Inverter 220 receives the carry input signal CI on input SI4 and generates an inverted carry signal CIZ on output node SO4. Inverter 230 has an output node SO5 and an input node SI5 connected to output XT. Inverter 230 receives a logic signal LS on input node SI5 and generates an inverted logic signal LSZ on output node SO5.

Full adder cell 200 also includes a carry output circuit 241D and a sum output circuit 250. Carry output circuit 240 has a first transmission gate 242 and a second transmission gate 244. First transmission gate 242 has an input node SI6 connected to adder input signal A, and an output node SO6 connected to adder output signal CO. Furthermore, first transmission gate 242 also contains a PC2 node connected to output XT of XOR gate 210, and an NC2 node connected to output node SO5 of inverter 230.

Referring to FIG. 2, it can be seen that when the logic signal LS is a logic low, transmission gate 242 will pass adder input signal A to the adder carry output signal CO. In other words, when the exclusive OR of the adder input signals A and B is a logic low, transmission gate 242 will pass the adder input signal A to the adder carry output signal CO.

Second transmission gate 244 has an input node SI7 connected to adder input signal CI, and an output node SO7 connected to adder output signal CO. Furthermore, second transmission gate 244 also contains a PC3 node connected to output node SO5 of inverter 230, and an NC3 node connected to output XT of XOR gate 210.

Referring to FIG. 2, it can be seen that when the logic signal LS is a logic high, transmission gate 244 will pass the adder carry input signal CI to the adder carry output signal CO. In other words, when the exclusive OR of adder input signals A and B is a logic high, transmission gate 244 will pass the adder carry input signal CI to the adder carry output signal CO.

Sum output circuit 250 has a first transmission gate 252 and a second transmission gate 254. First transmission gate 252 has an input node SI8 connected to adder carry input signal CI, and an output node SO8 connected to adder sum output signal S. Furthermore, first transmission gate 252 also contains a PC4 node connected to output XT of XOR gate 210, and an NC4 node connected to output node SO5 of inverter 230.

Referring to FIG. 2, it can be seen that when the logic signal LS is a logic low, transmission gate 252 will pass the adder carry input signal CI to the adder sum output signal S. In other words, when the exclusive OR of adder input signals A and B is a logic low, transmission gate 252 will pass the adder carry input signal CI to the adder sum output signal S.

Second transmission gate 254 has an input node SI9 connected to the inverted carry input signal CIZ, and an output node SO9 connected to adder sum output signal S. Furthermore, second transmission gate 254 also contains a PC5 node connected to output node SO5 of inverter 230, and an NC5 node connected to output XT of XOR gate 210.

Referring to FIG. 2, it can be seen that when the logic signal LS is a logic high, transmission gate 254 will pass the inverted carry input signal CIZ to the adder sum output signal S. In other words, when the exclusive OR of adder input signals A and B is a logic high, transmission gate 254 will pass the inverted carry input signal CIZ to the adder sum output signal S.

In operation, full adder cell 200 satisfies the same Boolean logic equations as full adder cell 100. Thus, for full adder cell 200, the sum output signal S will be high when only input signal A is high, or when only input signal B is high, or when only input signal CI is high, or when input signals A, B and CI are all high.

Referring to FIG. 2, when only input signal A is high, the inverted carry signal CIZ will be high and the logic signal LS will also be high. As a result, transmission gate 254 will pass the logic high on inverted carry signal CIZ to the adder sum output signal S.

As shown in FIG. 2, when only input signal B is high, the inverted carry signal CIZ will be high and the logic signal LS will also be high. As a result, transmission gate 254 will pass the logic high on inverted carry signal CIZ to the adder sum output signal S.

Referring to FIG. 2, when only carry input signal CI is high, logic signal LS will be a logic low. As a result, transmission gate 252 will pass the logic high on carry input signal CI to the adder sum output signal S.

As shown in FIG. 2, when input signals A, B and CI are all high, the logic signal LS will be low. As a result, transmission gate 252 will pass the logic high on carry input signal CI to the adder sum output signal S.

Referring to Eq. 2 in TABLE 3, the carry output signal CO will be high when input signals A and B are high, or when input signals A and CI are high, or when input signals B and CI are high.

As shown in FIG. 2, when input signals A and B are high, the logic signal LS will be low. As a result, transmission gate 242 will pass the logic high on input signal A to the adder carry output signal CO.

Referring to FIG. 2, when input signals A and CI are high, the logic signal LS will be high. As a result, transmission gate 244 will pass the logic high on carry input signal CI to the adder carry output signal CO.

As shown in FIG. 2, when input signals B and CI are high, the logic signal LS will be high. As a result, transmission gate 244 will pass the logic high on the carry input signal CI to the carry output signal CO.

Using Boolean algebra, the logic equations for adder cell 200 can be written as follows:

$$S = (A \odot B)CI + (AB)\overline{CI} \quad \text{Eq. 3}$$

$$CO = (A \odot B)A + (AB)CI \quad \text{Eq. 4}$$

in terms of the coincidence (XNOR) function (circle with a dot), and the exclusive OR (XOR) function (circle with a plus).

As shown in FIG. 2, more than half of the transistors in full adder cell 200 are used to form CMOS transmission gates (transistors M5–M6 and transistors M11–M18). Because of this, the present invention offers the following advantages:

1. It reduces the transistor count to only 18 devices. (Prior-art full adder cell 100 requires 28 devices).

2. It eliminates transistor stacking, allowing smaller device sizes to be used. (Prior-art full adder cell 100 stacks devices 2 high and 3 high.)

3. It reduces the number of inversions in the carry propagation path to one inversion or zero inversions. (Zero inversions applies when the carry output CO is unbuffered, as shown in FIG. 2. Prior-art full adder cell 100 contains two inversions in the carry propagation path).

4. It reduces the maximum number of inversions in the sum propagation path to only one inversion. (One inversion applies when the sum output S is unbuffered, as shown in FIG. 2. Prior-art full adder cell 100 contains 3 inversions in the sum propagation path).

The above advantages significantly decrease cell power dissipation, cell area and cell carry/sum propagation delay.

Because a full adder cell has 3 inputs and 2 outputs, it can have $2^5 = 32$ different combinations of active high/active low input/output signal polarity. Thus, as shown in FIG. 2, adder cell 200 embodies only one of 32 possible signal polarity configurations. (i.e. the particular configuration in which all signal polarities are active high).

Because of its unique logic topology, adder cell 200 can be easily transformed into any one of 32 different signal polarity configurations. This can be accomplished by simply reconnecting a wire or two, without having to add any extra inverters or extra devices. This is clearly a great advantage, because the cell size and cell power dissipation remain essentially constant, independent of the required signal polarity.

The methods by which adder cell 200 can be transformed into 32 different signal polarity configurations will now be described.

As shown in FIG. 2, carry output circuit 240 and sum output circuit 250 are composed of 8 transistors, M11–M18. Note, however, that only 2 complementary control signals, LS and LSZ, are required to drive the gate nodes of these 8 transistors.

When adder signals A and B both have the same signal polarity (both active high or both active low), the LS signal provides the XOR function of signals A and B, and the LSZ signal provides the XNOR function of signals A and B.

However, when adder signals A and B do not have the same logic polarity (A is active high and B is active low, or vice versa), the LS signal provides the XNOR function of signals A and B, and the LSZ function provides the XOR function of signals A and B.

From the foregoing discussion, it can be seen that when signals A and B both have the same signal polarity (both active high or both active low), the LS signal must be connected to nodes PC2, NC3, PC4 and NC5, and to SI5, the input to inverter 230. Furthermore, the SO5 output of inverter 230 must also be connected to nodes NC2, PC3, NC4 and PC5.

Similarly, it can also be seen that when signals A and B do not have the same signal polarity (A is active high and B is active low, or vice versa), the LS signal must be connected to nodes NC2, PC3, NC4 and PC5, and to SI5, the input to inverter 230. Furthermore, the SO5 output of inverter 230 must also be connected to transistor gates PC2, NC3, PC4 and NC5.

In summary, no matter what signal polarities are present at A and B, the control signals required to drive the gates of transistors M11–M18 will always be present, and at most 2 wires will have to be reconnected.

As shown in FIG. 2, when signal A has active high signal polarity, node SI6 must be connected to signal A. However, when signal A has active low signal polarity, node SI6 will have to be connected to the logical complement of signal A. This is not a problem, however, because the logical complement of signal A is located at node SO1, the output of inverter 212. Thus, no matter what signal polarity is present at A, at most 2 wires will have to be reconnected.

Referring to FIG. 2, when signal CI has active high signal polarity, nodes SI7 and SI8 must be connected to signal CI, and node SI9 must be connected to signal CIZ, the logical complement of signal CI. However, when signal CI has active low signal polarity, nodes SI7 and SI8 will have to be connected to signal CIZ, the logical complement of signal CI, and node SI9 will have to be connected to signal CI. This is not a problem, however, because the logical complement of signal CI is located at node SO4, the output of inverter 220. Thus, no matter what signal polarity is present at CI, at most 2 wires will have to be reconnected.

The foregoing signal polarity discussion applies to the case shown in FIG. 2, in which the active high carry output signal CO and the active high sum output signal S are both unbuffered. Of course, if non-inverting buffers are added at nodes OUT1 and OUT2 (in order to buffer high capacitance loads), the signal polarity considerations discussed above will still apply. However, if inverting buffers are added at OUT1 and OUT2, additional signal polarity considerations will be required. These considerations will now be described.

Referring to FIG. 2, when buffer inverters are placed at nodes OUT1 and OUT2, the signal polarity of the buffered output signals will become inverted. Thus the buffered output signals will become active low instead of active high. When this is the desired result, no further action is necessary. However, if the buffered outputs must still have active high signal polarity, even after the buffer inverters have been added, then the following steps must be taken.

Referring to FIG. 2, if a buffer inverter is placed at OUT1, the inverter output will be active high if the input signal at node SI6 is inverted and the input signal at node SI7 is inverted.

The input signal at node SI6 can be inverted by simply reconnecting node SI6 to SO1, the output of inverter 212. Similarly, the input signal at node SI7 can be inverted by simply reconnecting node SI7 to SO4, the output of inverter 220.

Again referring to FIG. 2, if a buffer inverter is placed at OUT2, the inverter output will be active high if the input signal at node SI8 is inverted and the input signal at node SI9 is inverted.

The input signal at node SI8 can be inverted by simply reconnecting node SI8 to SO4, the output of inverter 220. Similarly, the input signal at node SI9 can be inverted by simply reconnecting node SI9 to the CI input signal.

In summary, it has been shown that the input/output signal polarities of adder cell 200 can be changed by simply reconnecting a few wires, without having to add any inverters at the inputs/output; of adder cell 200. A few specific examples will now be presented.

Figure 3:
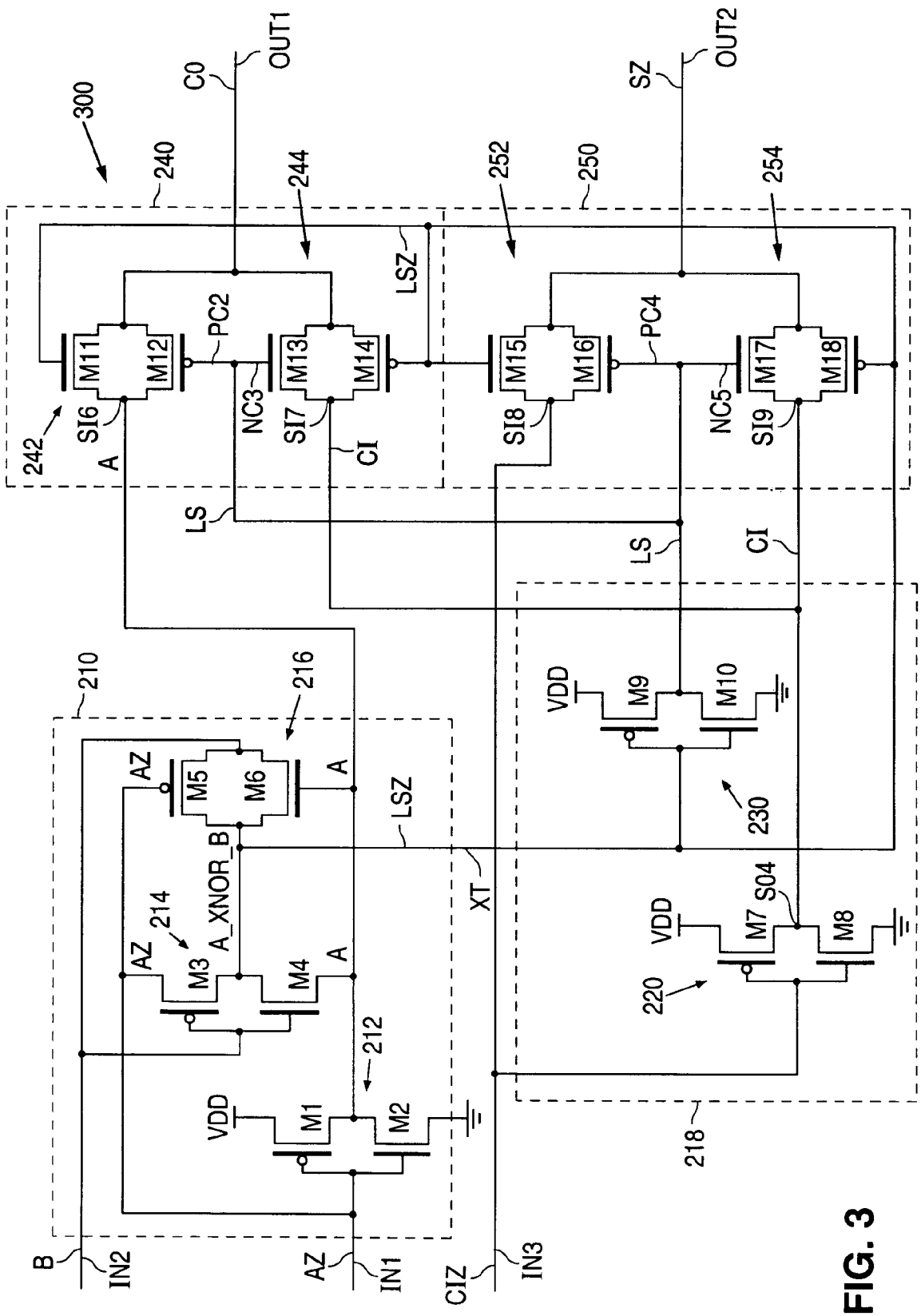
FIG. 3 is a schematic diagram illustrating a full adder cell 300 in accordance with the present invention.

In accordance with the present invention, FIG. 3 shows a schematic diagram illustrating a full adder cell 300. Full adder cell 300 is similar to full adder cell 200 and, as a result, utilizes the same reference numerals to designate the structures which are common to both cells.

As shown in FIG. 3, adder cell 300 differs from adder cell 200 in that adder inputs IN1 and IN3 of adder cell 300 are both active low (represented by signals AZ and CIZ, respectively), and adder output OUT2 is also active low (represented by signal SZ). Thus adder cell 300 represents one of 32 different signal polarity configurations.

Referring to FIG. 3, since the signal polarities at IN1 and IN2 (represented by signals AZ and B, respectively) are different, gate 210 performs the XNOR function instead of the XOR function. As a result, the output of inverter 230 is connected to node PC2 of transmission gate 242, node NC3 of transmission gate 244, node PC4 of transmission gate 252, and node NC5 of transmission gate 254.

Again referring to FIG. 3, in order to generate an active high carry output signal CO, node SI6 of transmission gate 242 is connected to signal A, the output of inverter 212. Furthermore, node SI7 of transmission gate 244 is connected to SO4, the output of inverter 220. In this example, output signal CO can receive signal A from transmission gate 242, or signal CI from transmission gate 244.

As shown in FIG. 3, in order to generate an active low sum output signal SZ, node SI8 of transmission gate 252 is connected to input signal CIZ, the active low carry input signal. Furthermore, node SI9 of transmission gate 254 is connected to SO4, the output of inverter 220. In this example, output signal SZ can receive signal CIZ from transmission gate 252, or signal CI from transmission gate 254.

Figure 4:
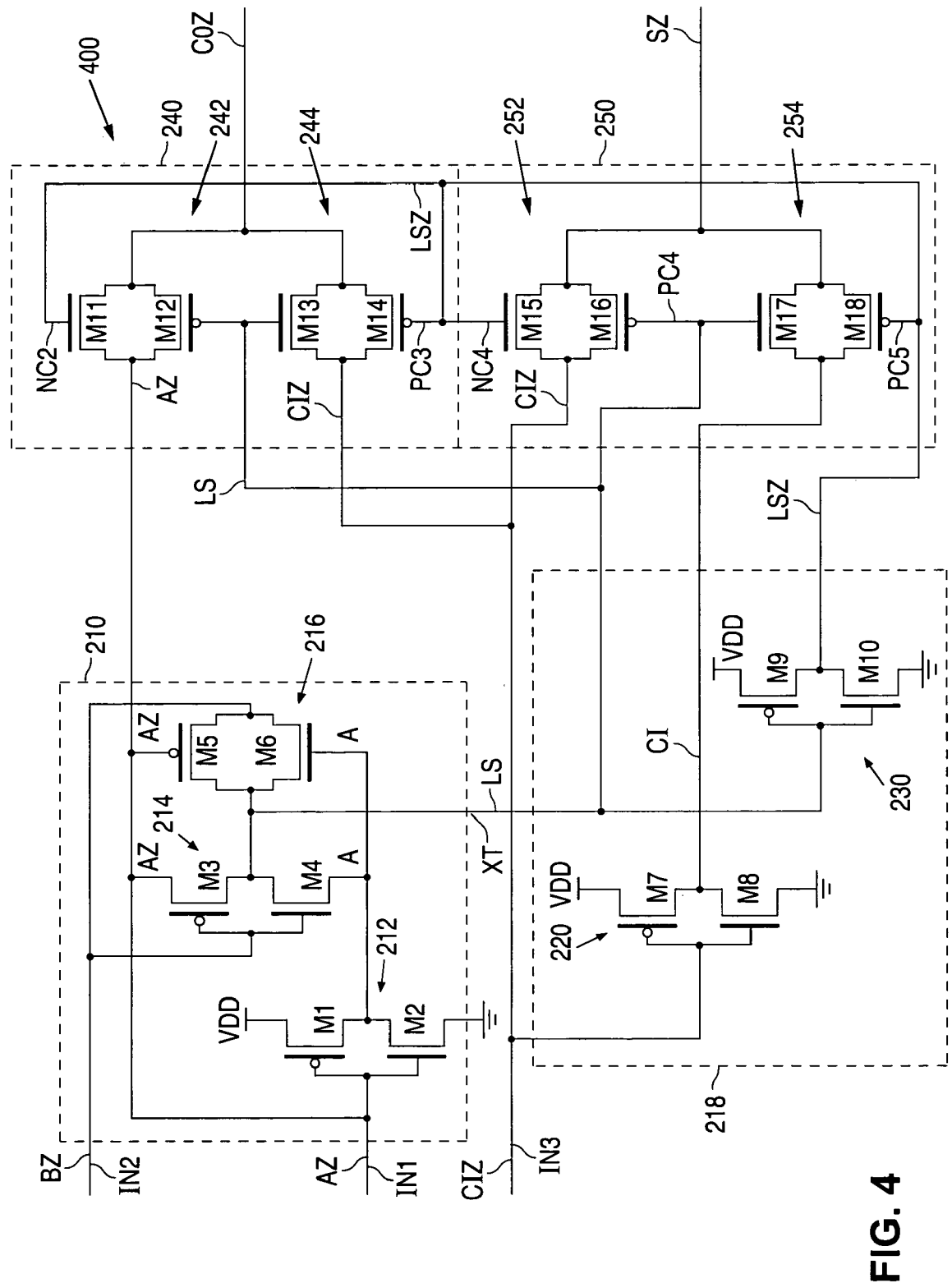
FIG. 4 is a schematic diagram illustrating a full adder cell 400 in accordance with the present invention.

In accordance with the present invention, FIG. 4 shows a schematic diagram illustrating a full adder cell 400. Full adder cell 400 is similar to cell 200 and, as a result, utilizes the same reference numerals to designate the structures which are common to both cells.

As shown in FIG. 4, cell 400 differs from cell 200 in that the input/output signals of cell 400 are all active low (represented by signals AZ, BZ, CIZ, COZ and SZ). Thus adder cell 400 represents one of 32 different signal polarity configurations.

Referring to FIG. 4, since the signal polarities of signals A and B are the same (both active low), gate 210 performs the XOR function. As a result, the output of inverter 230 is connected to node NC2 of transmission gate 242, node PC3 of transmission gate 244, node NC4 of transmission gate 252, and node PC5 of transmission gate 254. Furthermore, comparing adder 400 to adder 200, it can be seen that these adders are virtually identical—only the signal names (wire labels) in adder 400 have been changed.

Thus, signals A, B, CI, CO and S in adder 200 respectively become signals AZ, BZ, CIZ, COZ and SZ in adder 400. In this particular example, none of the wires inside of the full adder cell had to be reconnected, even though the signal polarities of all adder input/output signals were changed.

Figure 5:
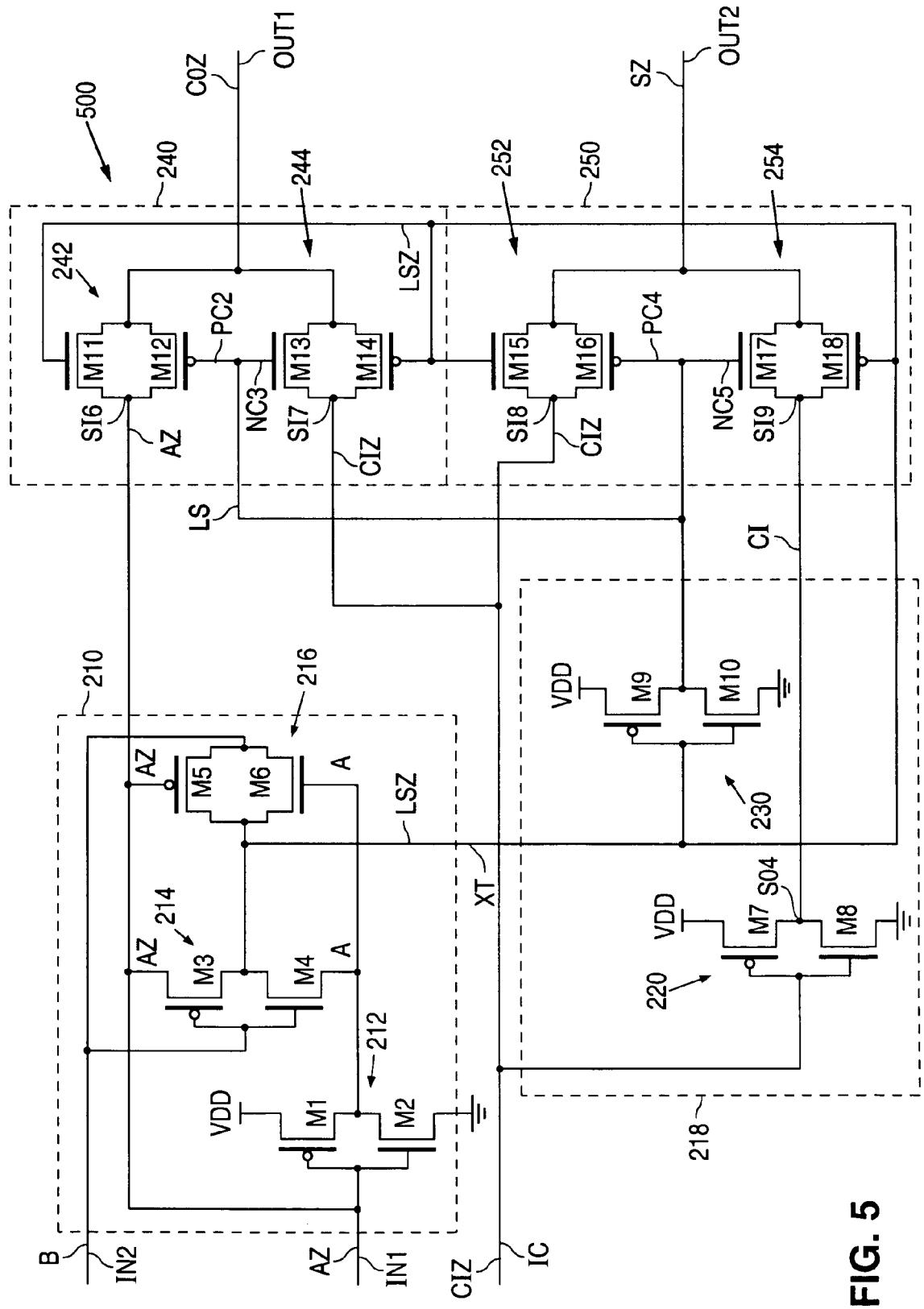
FIG. 5 is a schematic diagram illustrating a full adder cell 500 in accordance with the present invention.

In accordance with the present invention, FIG. 5 shows a schematic diagram illustrating a full adder cell 500. Full adder cell 500 is similar to full adder cell 200 and, as a result, utilizes the same reference numerals to designate the structures which are common to both cells.

As shown in FIG. 5, adder cell 500 differs from adder cell 200 in that all inputs/outputs of adder cell 500 are active low (represented by signals AZ, CIZ, COZ, and SZ), except for input IN2 (represented by signal B), which is active high. Thus adder cell 500 represents one of 32 different signal polarity configurations.

Referring to FIG. 5, since the signal polarities of signals A and B are different, gate 210 performs the XNOR function instead of the XOR function. As a result, the output of inverter 230 is connected to node PC2 of transmission gate 242, node NC3 of transmission gate 244, node PC4 of transmission gate 252, and node NC5 of transmission gate 254.

Again referring to FIG. 5, in order to generate an active low signal polarity at the carry output OUT1, node SI6 of transmission gate 242 is connected to adder input signal AZ. Furthermore, node SI7 of transmission gate 244 is connected to adder input signal CIZ. In this example, active low output signal COZ can receive signal AZ from transmission gate 242, or signal CIZ from transmission gate 244.

As shown in FIG. 5, in order to generate an active low signal polarity at the sum output OUT2, node SI8 of transmission gate 252 is connected to adder input signal CIZ. Furthermore, node SI9 of transmission gate 254 is connected to signal CI at node SO4, the output of inverter 220. In this example, active low output signal SZ can receive signal CIZ from transmission gate 252, or signal CI from the output of inverter 220.

Figure 6:
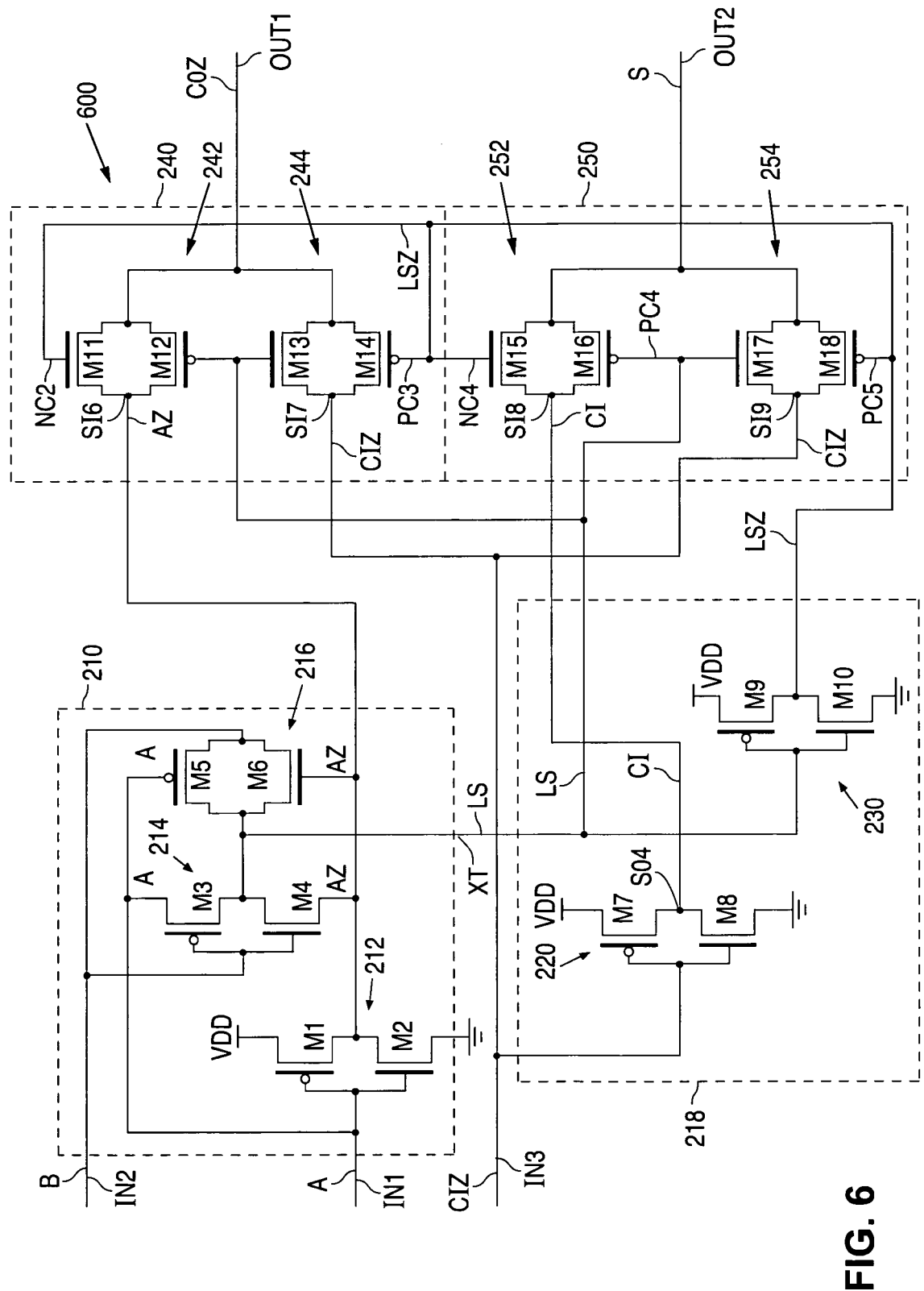
FIG. 6 is a schematic diagram illustrating a full adder cell 600 in accordance with the present invention.

In accordance with the present invention, FIG. 6 shows a schematic diagram illustrating a full adder cell 600. Full adder cell 600 is similar to full adder cell 200 and, as a result, utilizes the same reference numerals to designate the structures which are common to both cells.

As shown in FIG. 6, adder cell 600 differs from adder cell 200 in that, for adder cell 600, input IN3 is active low (represented by signal CIZ) and output OUT1 is also active low (represented by signal COZ). All of the remaining inputs and outputs of adder cell 600 are active high. Thus adder cell 600 represents one of 32 different signal polarity configurations.

Referring to FIG. 6, since the signal polarities of signals A and B are the same (both active high), gate 210 performs the XOR function. As a result, the output of inverter 230 is connected to node NC2 of transmission gate 242, node PC3 of transmission gate 244, node NC4 of transmission gate 252, and node PC5 of transmission gate 254.

Again referring to FIG. 6, in order to generate an active low signal polarity at carry output OUT1, node SI6 of transmission gate 242 is connected to signal AZ. Furthermore, node SI7 of transmission gate 244 is connected to adder input signal CIZ. In this example, active low output signal COZ can receive signal AZ from transmission gate 242, or signal CIZ from transmission gate 244.

As shown in FIG. 6, in order to generate an active high signal polarity at sum output OUT2, node SI8 of transmission gate 252 is connected to signal CI at node SO4, the output of inverter 220. Furthermore, node SI9 of transmission gate 254 is connected to CIZ, the active low carry input signal. In this example, output signal S can receive signal CI from transmission gate 252, or signal CIZ from transmission gate 254.

As described in the above examples, adder cell 200 generates the logical complement pairs A/AZ, CI/CIZ and A_XOR B/A_XNOR_B (logic signals LS/LSZ). Nevertheless, the logical complement of input signal B is not available. This is not a problem, however, because when signal BZ is input to cell 200 (instead of signal B), the output of logic gate 210 will simply become equal to A_XNOR_B (instead of A_XOR_B). Similarly, the output of inverter 230 will become equal to A_XOR_B instead of A_XNOR_B. Thus the logical complement of input B is not required.

From the full adder examples shown in FIGS. 2–6, it can be seen that the logic polarity of any adder input/output signal can be readily changed, without adding any additional transistors to the basic adder cell. This allows the cell size and the cell power dissipation to be independent of the I/O signal polarity, a significant advantage.

The adder cells shown in FIGS. 2–6 all have unbuffered outputs. However, as previously described, in high fanout applications it is usually necessary to buffer the carry output signal CO and/or the sum output signal S. This can be readily accomplished by simply adding a non-inverting buffer or an inverting buffer (inverter) to one or both of these outputs.

Figure 7:
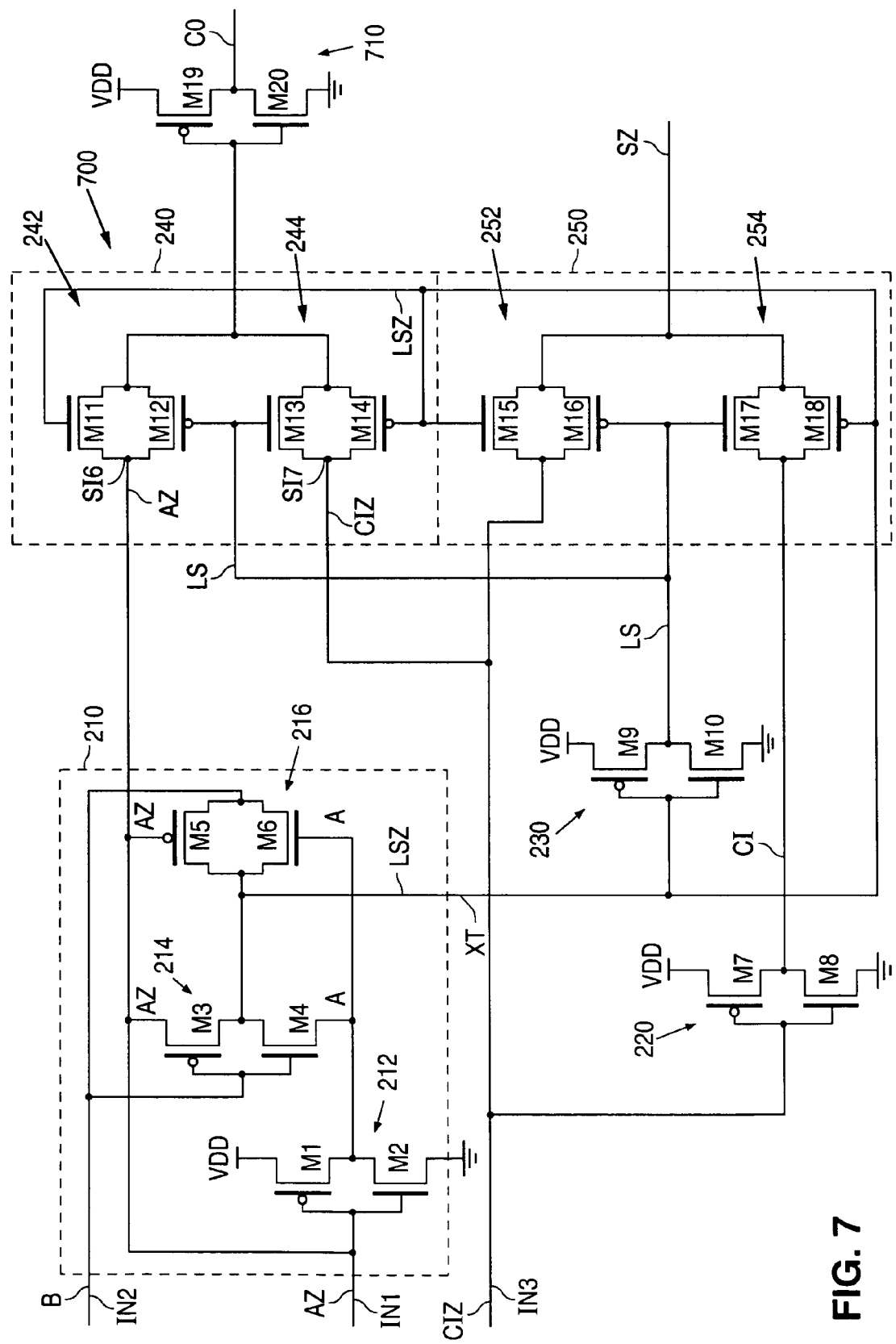
FIG. 7 is a schematic diagram illustrating a full adder cell 700 in accordance with the present invention.

In accordance with the present invention, FIG. 7 shows a schematic diagram illustrating a full adder cell 700. Full adder cell 700 is similar to full adder cell 300 and, as a result, utilizes the same reference numerals to designate the structures which are common to both cells.

As shown in FIG. 7, adder cell 700 differs from adder cell 300 in that the carry output signal CO in cell 700 is buffered by the addition of an inverter 710 (transistors M19/M20). As a result of the inversion provided by inverter 710, node SI6 of transmission gate 242 is connected to active low adder input IN1 (signal AZ), and node SI7 of transmission gate 244 is connected to active low adder input IN3 (signal CIZ). Thus, although an inverter has been added to the carry output path in FIG. 7, the polarity of the carry output has remained unchanged—i.e. it is still active high, the same as in FIG. 3. (If required, the polarity of the carry output signal could have been changed from active high to active low in FIG. 7).

Although the addition of a buffer inverter to the carry output and/or the sum output increases the cell device count, it does riot alter the unique logic topology of the cell. Thus, as described above for the unbuffered cell configurations, all 32 possible input/output signal polarity configurations can also be obtained with the buffered cell, without having to add any additional devices.

By utilizing the present invention, many different buffered/unbuffered adder cell topologies can be created. As described above, all of these adder cell topologies will have very low power dissipation and very small cell size. Furthermore, these adder cell topologies can be used in many different applications, including ripple carry applications, fast carry applications and fast sum applications (i.e. parallel adder applications in which many addends must be quickly summed).

Figure 8:
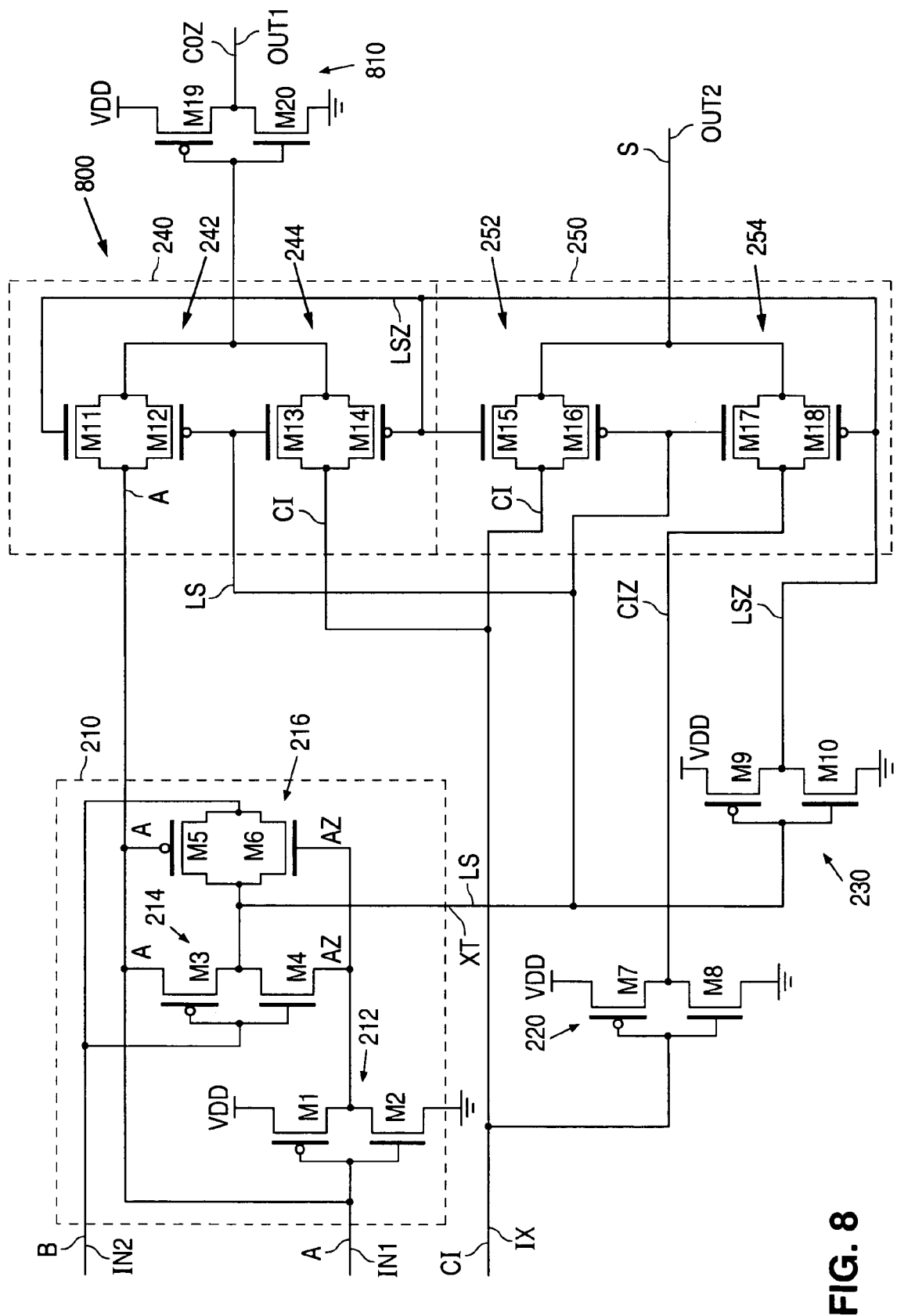
FIG. 8 is a schematic diagram illustrating a full adder cell 800 in accordance with the present invention.

In accordance with the present invention, FIG. 8 shows a schematic diagram illustrating a full adder cell 800. Full adder cell 800 is similar to full adder cell 200 and, as a result, utilizes the same reference numerals to designate the structures which are common to both cells.

As shown in FIG. 8, adder cell 800 differs from adder cell 200 in that adder cell 800 has an active low carry output signal COZ, whereas adder cell 200 has an active high carry output signal CO.

The active low carry output signal COZ in adder cell 800 is generated by the added inverter 810 (transistors M19/M20). Furthermore, by comparing adder cell 800 to adder cell 200, it can be seen that the logic signal polarities inside both cells are the same. The only difference is that, in adder cell 800, an inverter has been added to the carry output path, causing the carry output to become active low.

Figure 9:
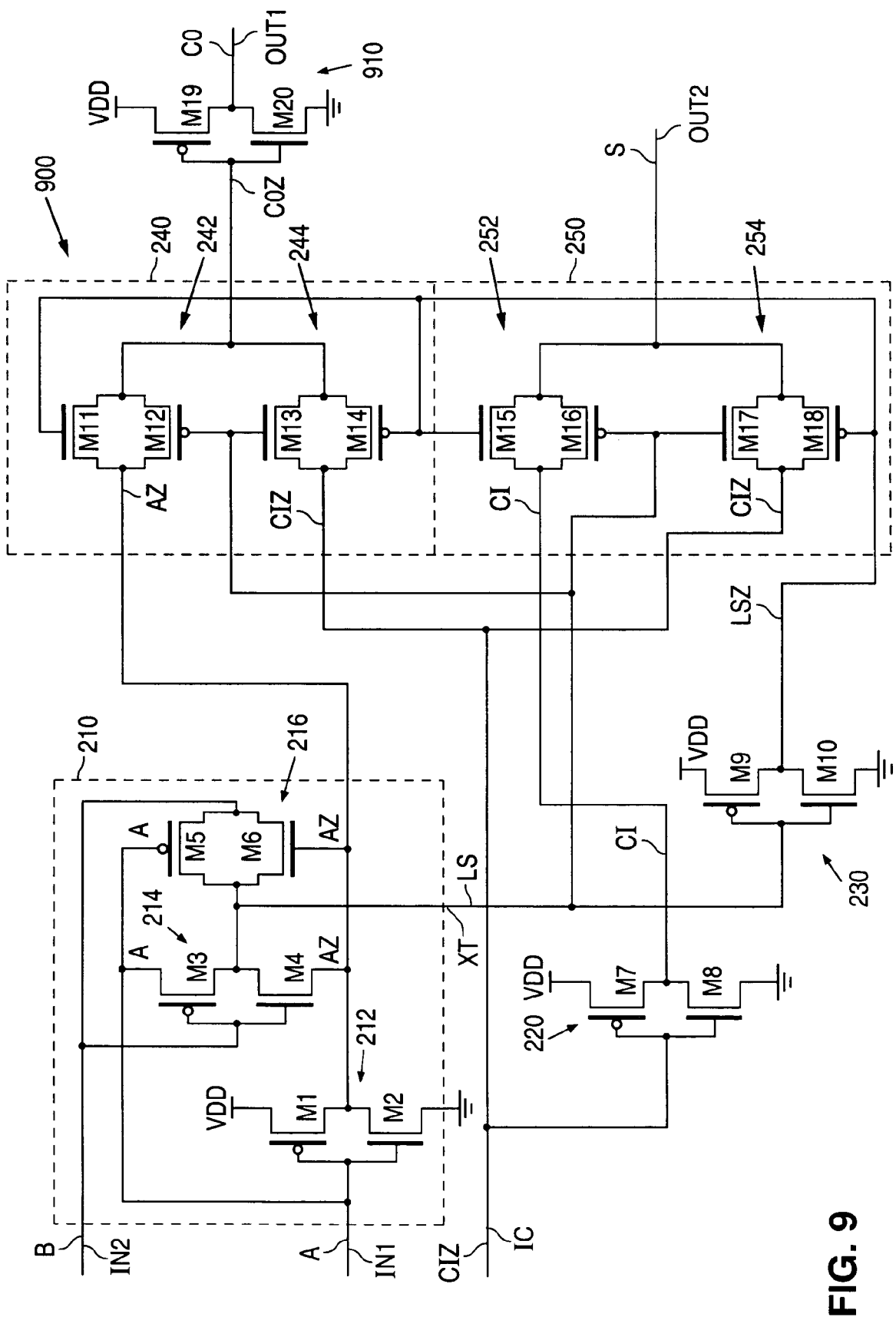
FIG. 9 is a schematic diagram illustrating a full adder cell 900 in accordance with the present invention.

In accordance with the present invention, FIG. 9 shows a schematic diagram illustrating a full adder cell 900. Full adder cell 900 is similar to full adder cell 600 and, as a result, utilizes the same reference numerals to designate the structures which are common to both cells.

As shown in FIG. 9, adder cell 900 differs from adder cell 600 in that adder cell 900 has an active high carry output signal CO, whereas adder cell 600 has an active low carry output signal COZ.

The active high carry output signal CO in adder cell 900 is generated by the added inverter 910 (transistors M19/M20). Furthermore, by comparing adder cell 900 to adder cell 600, it can be seen that the logic signal polarities inside both cells are the same. The only difference is that, in adder cell 900, an inverter has been added to the carry output path, causing the carry output signal to become active high.

Adder cells 800 and 900 both have active high input signals A and B, and an active high sum output signal S. However, adder cell 800 has an active high carry input signal CI and an active low carry output signal COZ, whereas adder cell 900 has an active low carry input signal CIZ and an active high carry output signal CO.

Adder cells 800 and 900 both have buffered carry outputs. Furthermore, they both have only one inversion in their internal carry propagation paths. Thus, when both of these cells are used together in ripple carry applications, the total number of inversions in the longest carry propagation path will be reduced by a factor of two (in comparison to prior-art adder cell 100). This is a very significant decrease because it speeds up carry propagation by a factor of 2, and it also decreases full adder power dissipation.

Figure 10:
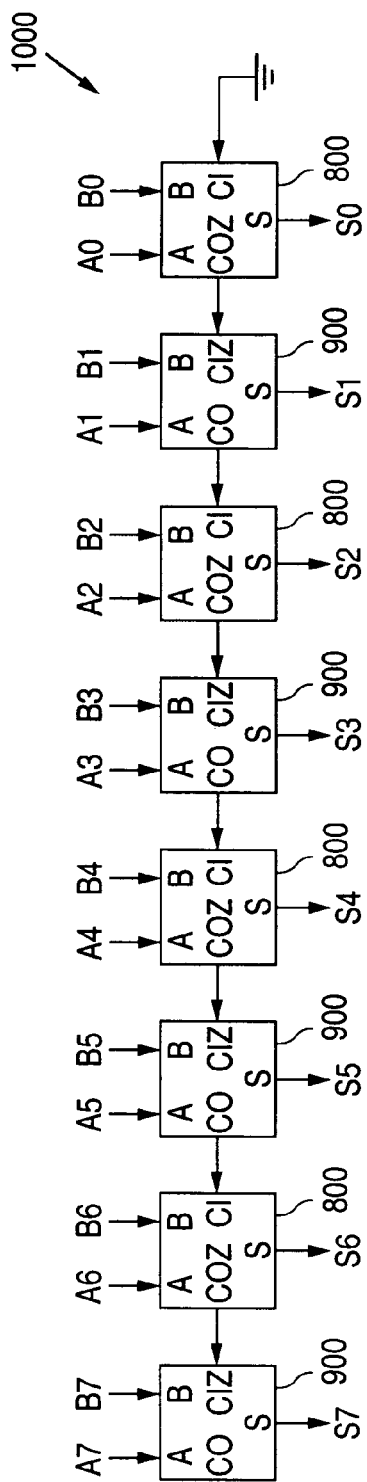
FIG. 10 is a schematic diagram illustrating an eight bit ripple carry adder 1000 in accordance with the present invention.

In accordance with the present invention, FIG. 10 shows a schematic diagram illustrating an eight bit ripple carry adder block 1000. As shown in FIG. 10, adder block 1000 utilizes adder cells 800 and 900. As previously described, carry propagation is appreciably speeded up because there is only one carry inversion per adder cell. Thus the longest ripple carry path in adder block 1000 includes only 7 inverters.

In high speed adder applications, the carry ripple time must be reduced to an absolute minimum. This can be accomplished by interleaving two different types of adder cells—i.e. cells which have only one carry inversion per adder cell (such as the two cells shown in FIGS. 8 and 9), and cells which have no carry inversion per adder cell (such as the cell shown in FIG. 2).

Figure 11:
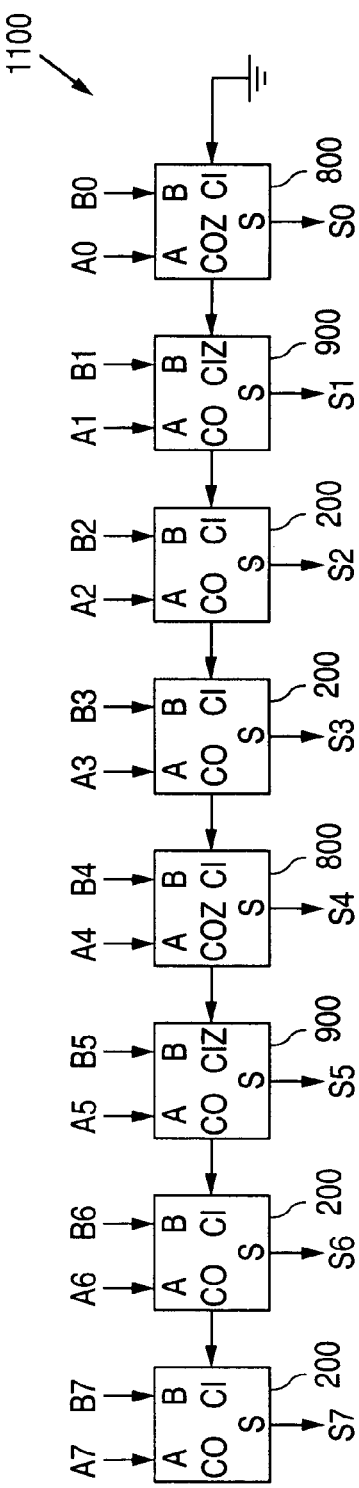
FIG. 11 is a schematic diagram illustrating an eight bit ripple carry adder 1100 in accordance with the present invention.

In accordance with the present invention, FIG. 11 shows a schematic diagram illustrating an eight bit ripple carry adder block 1100. As shown in FIG. 11, adder block 1100 utilizes adder cells 800 and 900, which have one carry inversion, and adder cell 200, which has no carry inversion. Referring to FIG. 11, it can be seen that adder block 1100 contains 4 adder cells which have no carry inversion, and 4 adder cells which have one carry inversion. Therefore, in adder block 1100 the average number of carry inversions per adder cell is equal to 4/8=0.5, which reduces the carry ripple time and the cell power dissipation in comparison to adder block 1000.

Referring to FIG. 11, if all of the adder cells had no carry inversion, the total ripple carry time would actually increase instead of decrease. This would occur because, without carry inversion, the total carry ripple path would behave as a passive RC network which does not have any AC voltage gain.

The optimum combination of cell types, which produces minimal carry ripple time, depends upon several factors. These factors include transistor sizing, relative cell placement, cell parasitics, and the CMOS technology being used.

In parallel adder applications, sum propagation time is often the speed limiting factor (rather than carry propagation time). This is especially true when carry save and/or carry look ahead techniques are being used. Thus, when many numbers must be added together in parallel (i.e. at the same time), minimizing the sum propagation time is very important.

The sum propagation time can be minimized by utilizing techniques similar to those described above for minimizing carry ripple time. Thus, the polarity of the sum output signals can be alternated in the same way that the polarity of the carry output signals can be alternated.

Figure 12:
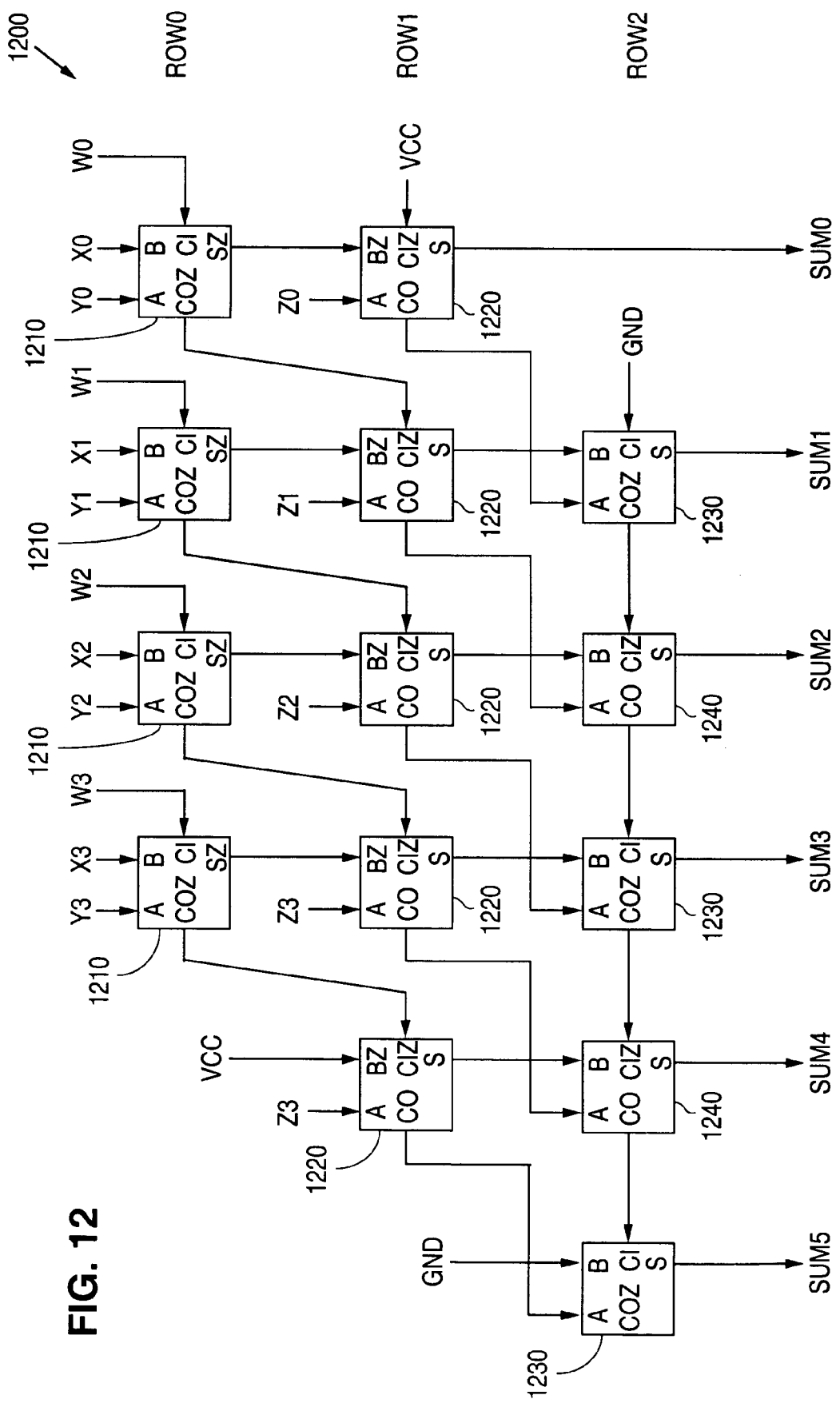
FIG. 12 is a schematic diagram illustrating a carry save parallel adder 1200 in accordance with the present invention.

In accordance with the present invention, FIG. 12 shows a schematic diagram illustrating a parallel adder block 1200. Adder block 1200 contains three cell rows: ROW0, ROW1, and ROW2. Furthermore, these cell rows utilize four different types of adder cells: 1210, 1220, 1230 and 1240. These adder cell types represent 4 of the 32 different input/output polarity combinations that can be created by utilizing the present invention. As discussed above, these cell types have the same cell area and dissipate the same amount of power.

Referring to FIG. 12, adder ROW0 contains four cells of adder type 1210. Similarly, adder ROW1 contains five cells of adder type 1220. Finally, adder ROW2 contains five cells, three of adder type 1230 and two of adder type 1240. (These two cell types are alternately placed in the left to right direction).

As shown in FIG. 12, adder block 1200 receives four active high operand inputs (W, X, Y, Z), each of which contains four bits [3:0]. Furthermore, adder block 1200 also generates an active high sum output consisting of six bits, SUM[5:0].

In operation, parallel adder 1200 simultaneously adds three 4 bit words (W[3:0], X[3:0], Y[3:0] and Z[3:0]). In ROW0, the sum path is from B to SZ. In ROW1, however, the sum path is from BZ to S. Thus the polarity of the sum path alternates between ROW0 and ROW 1.

Referring to FIG. 12, it can be seen that the polarity of the carry signals alternates in the vertical direction and in the horizontal direction. Furthermore, ROW0 and ROW1 utilize carry save addition, whereas ROW2 utilizes carry ripple addition.

Figure 13:
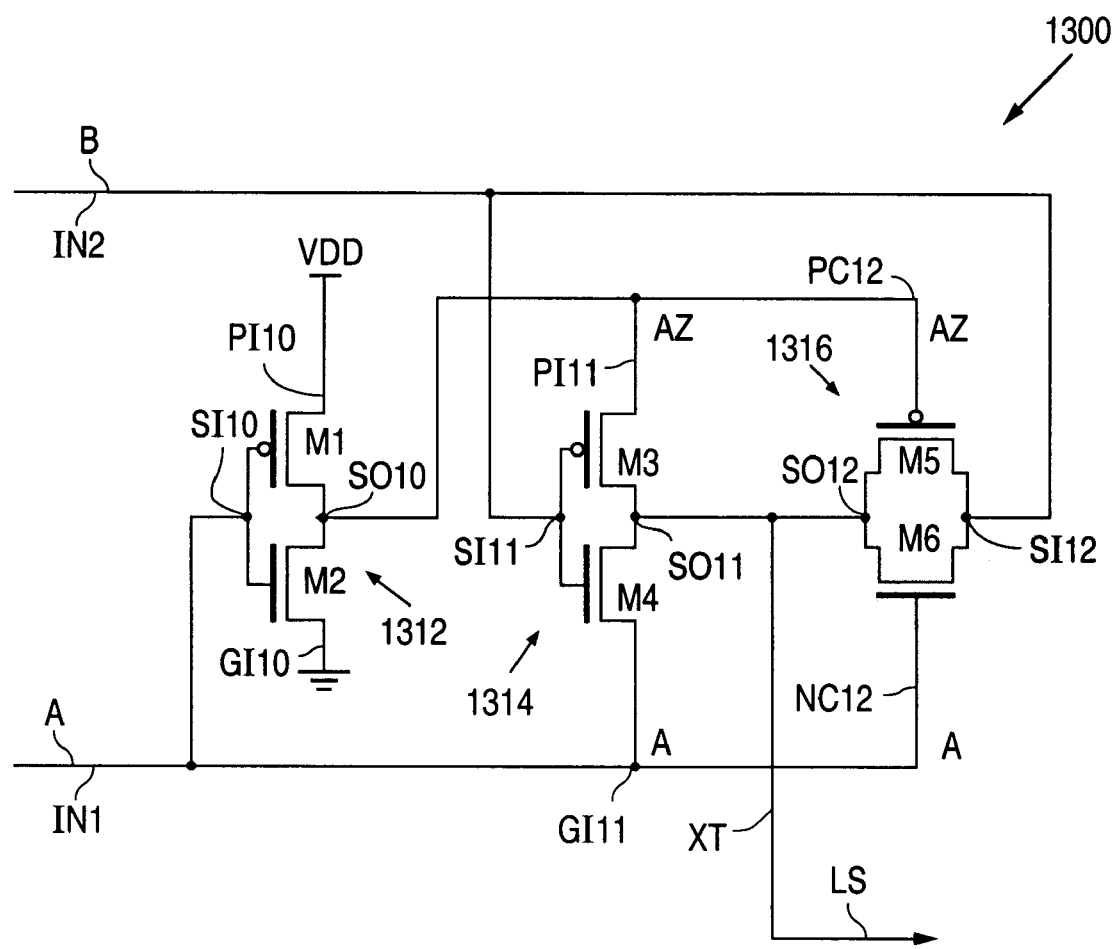
FIG. 13 is a schematic diagram illustrating a logic gate 1300 in accordance with the present invention.

In accordance with the present invention, FIG. 13 shows a schematic diagram illustrating a logic gate 1300. As described in detail below, when input signals A and B are of the same signal polarity, logic gate 1300 generates the XNOR function of A and B. Similarly, when input signals A and B are of different signal polarity, logic gate 1300 generates the XOR function of A and B.

As shown in FIG. 13, logic gate 1300 includes a first inverter 1312, a second inverter 1314, and a transmission gate 1316. Inverter 1312 has an input node SI10 connected to adder input IN1 and an output node SO10. Inverter 1312 also contains a third node PI10 connected to a power supply VDD and a fourth node GI10 connected to ground. Inverter 1312 receives input signal A and generates an inverted logic signal AZ.

Inverter 1314 has an input node SI11 connected to adder input IN2, and an output node SO11 connected to output XT. Furthermore, inverter 1314 also contains a PI11 node connected to output SO10 of inverter 1312, and a GI11 node connected to input node IN1.

Transmission gate 1316 has an input node SI12 connected to adder input IN2, and an output node SO12 connected to output XT. Furthermore, transmission gate 1316 also contains a PC12 node connected to output SO10 of inverter 1312, and an NC12 node connected to input node IN1.

Comparing logic gate 1300 in FIG. 13 with logic gate 210 in FIG. 2, it can be seen that the only difference between the two logic gates is related to the placement of inverters 212/1312. Thus, when input signals A and B are of the same logic polarity, logic gate 210 generates the XOR function of A and B, whereas logic gate 1300 generates the XNOR function of A and B. Similarly, when input signals A and B are of different logic polarity, logic gate 210 generates the XNOR function of A and B, whereas logic gate 1300 generates the XOR function of A and B.

In order to function correctly, full adder 200 in FIG. 2 requires the XOR function of inputs IN1 and IN2, as well as the XNOR function of these inputs. Thus, when output XT generates the XOR function of IN1 and IN2, output node SO5 of inverter 230 will generate the XNOR function of these inputs. Conversely, if output XT were to generate the XNOR function of inputs IN1 and IN2, then output node SO5 of inverter 230 would generate the XOR function of these inputs. Therefore, those skilled in the art will appreciate that either logic gate 210 or logic gate 1300 can be used in the construction of adder cell 200.

When logic gate 210 performs the XOR function (assuming that signals A and B have the same signal polarity) or when logic gate 1300 performs the XOR function (assuming that signals A and B have different signal polarities), the LS signal must be connected to nodes PC2, NC3, PC4 and NC5, and to node SI5, the input to inverter 230. Furthermore, the S05 output of inverter 230 must be connected to nodes NC2, PC3, NC4 and PC5.

Similarly, when gate 210 performs the XNOR function (assuming that signals A and B have different signal polarities), or when logic gate 1300 performs the XNOR function (assuming that signals A and B have the same signal polarity), the LS signal must be connected to nodes NC2, PC3, NC4 and PC5, and to node SI5, the input to inverter 230. Furthermore, the S05 output of inverter 230 must also be connected to nodes PC2, NC3, PC4 and NC5.

In summary, the present invention describes a class of full adder cells which offer the following significant advantages:

1) The cells consume minimum power and minimum area due to their low device count and their liberal use of non-stacked CMOS transmission gates.
2) The cells support all possible combinations of input/output signal polarity, without increasing cell size or cell power dissipation.

3) The cells allow fast carry/sum propagation, resulting in high speed operation.
4) The cells support buffered or unbuffered sum and carry outputs.

With respect to power savings and area savings, full adder cells 800 and 900 consume one half the area and dissipate one sixth the power in comparison to prior-art full adder cell 100. (This comparison applies when all cells are running at the same operating frequency and driving the same load capacitance).

It should be understood that various alternatives to the invention described herein may be employed in practicing the invention. Therefore, it is intended that the following claims define the scope of the invention, and that methods and structures within the scope of these claims, and their equivalents, be covered thereby.

What is claimed is:

1. An adder circuit comprising:
    a first adder cell having:
        a first logic gate having a first input that receives a first input signal, a second input that receives a second input signal, and a first output that generates a first logic signal, the first input signal, the second input signal, and the first logic signal each having a logic state, the first logic gate generating the first logic signal in response to the logic states of the first and second input signals, the first logic gate generating an inverted first input signal in response to the first input signal;
        a first inverter circuit having a third input that receives a third input signal, a fourth input connected to receive the first logic signal, a first output that generates an inverted third signal, and a second output that generates an inverted first logic signal;
        a first carry out circuit having a first control input connected to receive the first logic signal, a second control input connected to receive the inverted first logic signal, and an output, the carry out circuit including a first multiplexer that passes a first received signal to the output of the first carry out circuit when the first logic signal has a first logic state, and passes a second received signal to the output of the first carry out circuit when the first logic signal has a second logic state, the first received signal being the first input signal; and
        a first sum circuit having a first control input connected to receive the first logic signal, a second control input connected to receive the inverted first logic signal, a first sum input connected to the third input signal, a second sum input connected to the inverted third signal, and an output, the second sum input and the output of the first sum circuit not be directly connected together.

2. The adder of claim 1 wherein the second received signal is the third input signal.

3. The circuit of claim 2 wherein the first logic gate is an XOR gate when the first input signal and the second input signal have equivalent signal polarities.

4. The circuit of claim 2 wherein the first logic gate is an XOR gate when the first input signal and the second input signal have different signal polarities.

5. The adder of claim 1 wherein the first sum circuit includes a second multiplexer that passes a third received signal to the output of the first sum circuit when the logic signal has a first logic state, and passes a fourth received signal to the output of the first sum circuit when the logic signal has a second logic state.

6. The adder of claim 5 wherein the third received signal is the third input signal, an input to the second multiplexer being connected to the first sum input.

7. The adder of claim 5 wherein the fourth received signal is the inverted third signal.

8. The adder of claim 1 and further comprising a first buffering inverter having an input connected to the output of the first carry out circuit, and an output.

9. The adder circuit of claim 1
    wherein the output of the first carry out circuit has a first active state; and
    further comprising:
    a second adder cell connected to receive a signal from the output of the first carry out circuit of the first adder cell, the second adder cell having:
        a second logic gate having a fifth input that receives a fifth input signal, a sixth input that receives a sixth input signal, and a second output that generates a second logic signal, the fifth input signal, the sixth input signal, and the second logic signal each having a logic state, the second logic gate generating the second logic signal in response to the logic states of the fifth and sixth input signals, the second logic gate generating an inverted fifth signal in response to the fifth input signal;
        a second inverter circuit having a seventh input that receives a seventh input signal, an eighth input connected to receive the second logic signal, a first output that generates an inverted seventh signal, and a second output that generates an inverted second logic signal;
        a second carry out circuit having a first control input connected to receive the second logic signal, a second control input connected to receive the inverted second logic signal, and a second output, the second carry out circuit including a second multiplexer that passes a third received signal to the output of the second carry out circuit when the first logic signal has a first logic state, and passes the signal from the output of the first carry out circuit to the output of the second carry out circuit when the first logic signal has a second logic state, the second output of the second carry out circuit having a second active state opposite the first active state; and
        a second sum circuit having a first control input connected to receive the second logic signal, a second control input connected to receive the inverted second logic signal, and an output.

10. The adder circuit of claim 9 and further comprising:
    a third adder cell connected to receive a signal from the output of the second carry out circuit of the second adder cell, the third adder cell having:
        a third logic gate having an ninth input that receives a ninth input signal, a tenth input that receives a tenth input signal, and a third output that generates a third logic signal, the ninth input signal, the tenth input signal, and the third logic signal each having a logic state, the third logic gate generating the third logic signal in response to the logic states of the ninth and tenth input signals, the third logic gate generating an inverted ninth signal in response to the ninth input signal;
        a third inverter circuit having a eleventh input that receives an eleventh input signal, a twelfth input connected to receive the third logic signal, a first output that generates an inverted third signal, and a second output that generates an inverted third logic signal;

a third carry out circuit having a first control input connected to receive the third logic signal, a second control input connected to receive the inverted third logic signal, and a second output, the second output of the third carry out circuit having a second active state; and a third sum circuit having a first control input connected to receive the third logic signal, a second control input connected to receive the inverted third logic signal, and an output.

11. The adder circuit of claim 10 wherein the first adder cell is in a first row, the second adder cell is in a second row, and the third adder cell is in a third row.

12. The adder circuit of claim 9 wherein the first adder cell is in a first row and the second adder cell is in a second row.

13. An adder circuit comprising:
a first adder cell having:
a first exclusive OR circuit having a first input, a second input, and an output, the output having a logic state that represents an exclusive ORing of a logic state on the first input and a logic state on the second input;
a first output circuit having:
a first transmission gate having an input, an output, a first transistor, and a second transistor, the first transistor having a first terminal connected to the input of the first transmission gate, a second terminal connected to the output of the first transmission gate, and a first gate electrically isolated from the first and second terminals, the second transistor having a first terminal connected to the input of the first transmission gate, a second terminal connected to the output of the first transmission gate, and a second gate electrically isolated from the first and second terminals of the second transistor, the input of the first transmission gate being connected to the first input of the exclusive OR circuit;
a second transmission gate having an input, an output, a first transistor, and a second transistor, the first transistor of the second transmission gate having a first terminal connected to the input of the second transmission gate, a second terminal connected to the output of the second transmission gate, and a first gate electrically isolated from the first and second terminals of the first transistor of the second transmission gate, the second transistor of the second transmission gate having a first terminal connected to the input of the second transmission gate, a second terminal connected to the output of the second transmission gate, and a second gate electrically isolated from the first and second terminals of the second transistor of the second transmission gate, the outputs of the first and second transmission gates being connected together;
a third transmission gate having an input, an output, a first transistor, and a second transistor, the first transistor of the third transmission gate having a first terminal connected to the input of the third transmission gate, a second terminal connected to the output of the third transmission gate, and a first gate electrically isolated from the first and second terminals of the first transistor of the third transmission gate, the second transistor of the third transmission gate having a first terminal connected to the input of the third transmission gate, a second terminal connected to the output of the third transmission gate, and a second gate electrically isolated from the first and second terminals of the second transistor of the third transmission gate;

a fourth transmission gate having an input, an output, a first transistor, and a second transistor, the first transistor of the fourth transmission gate having a first terminal connected to the input of the fourth transmission gate, a second terminal connected to the output of the fourth transmission gate, and a first gate electrically isolated from the first and second terminals of the first transistor of the fourth transmission gate, the second transistor of the fourth transmission gate having a first terminal connected to the input of the fourth transmission gate, a second terminal connected to the output of the fourth transmission gate, and a second gate electrically isolated from the first and second terminals of the second transistor of the fourth transmission gate, the outputs of the third and fourth transmission gates being connected together; and a first inverting circuit having an input connected to the input of the second transmission gate and the input of the third transmission gate, and an output connected to the input of the fourth transmission gate.

14. The adder circuit of claim 13 wherein the first gates of the first and third transmission gates and the second gates of the second and fourth transmission gates are connected together.

15. The adder circuit of claim 14 and further comprising a second inverting circuit having an input connected to the output of the first exclusive OR circuit, and an output connected to the first gate of the first transmission gate.

16. The adder circuit of claim 13 and further comprising:
a second adder cell having:
a second exclusive OR circuit having a first input, a second input, and an output;
a second output circuit having:
a fifth transmission gate having first and second transistors connected to an input and an output, the first and second transistors of the fifth transmission gate having first and second gates, respectively;
a sixth transmission gate having first and second transistors connected to an input and an output, the first and second transistors of the sixth transmission gate having first and second gates, respectively, the outputs of the fifth and sixth transmission gates being connected together, the input of the sixth transmission gate being connected to the output of the first transmission gate; and
a second inverting circuit connected to the outputs of the fifth and sixth transmission gates.

17. The adder circuit of claim 13 and further comprising a second inverting circuit having an input connected to the output of the first transmission gate of the first output circuit; and
a second adder cell having:
a second exclusive OR circuit having a first input, a second input, and an output;
a second output circuit having:
a fifth transmission gate having first and second transistors connected to an input and an output, the first and second transistors of the fifth transmission gate having first and second gates, respectively; and a sixth transmission gate having first and second transistors connected to an input and an output, the first and second transistors of the sixth transmission gate having first and second gates, respectively, the outputs of the fifth and sixth transmission gates being connected together, the input of the sixth transmission gate being connected to the output of the second inverting circuit.

18. The adder of claim 17 wherein:

the first exclusive OR circuit includes a third inverting circuit that has an input connected to the first input of the first exclusive OR circuit, and an output; and the input of the first transmission gate is connected to the input of the third inverting circuit.

19. The adder of claim 18 wherein the second exclusive OR circuit includes a fourth inverting circuit that has an input connected to the first input of the second exclusive OR circuit, and an output; and the input of the fifth transmission gate is connected to the output of the fourth inverting circuit.

20. The adder circuit of claim 17 wherein the first adder cell is in a first row and the second adder cell is in a second row.

21. The adder circuit of claim 20 wherein only first adder cells are in the first row, and none of the first adder cells in the first row are electrically connected together.

22. The adder circuit of claim 21 wherein only second adder cells are in the second row, and none of the second adder cells in the second row are electrically connected together.

23. The adder circuit of claim 22 and further comprising a third row of adder cells connected to the second row of adder cells, the third row including first and second adder cells.

* * * * *

UNITED STATES PATENT AND TRADEMARK OFFICE
CERTIFICATE OF CORRECTION

PATENT NO. : 7,185,042 B1
APPLICATION NO. : 10/014287
DATED : February 27, 2007
INVENTOR(S) : Pasqualini It is certified that error appears in the above-identified patent and that said Letters Patent is hereby corrected as shown below:

Column 5,

Line 49, delete "241D" and replace with --240--.

Column 7,

Lines 15 thru 18, delete "Equations 3 and 4" and replace with $$S = (A \oplus B)Ci + (A \oplus B)\overline{Ci} \quad \text{Eq. 3}$$
$$CO = (A \oplus B)A + (A \oplus B)Ci \quad \text{Eq. 4}$$

Column 9,

Line 16, delete "S19" and replace with --SI9--.

Line 21, delete "inputs/output;" and replace with --inputs/outputs--.

Column 11,

Line 15, delete, "A_XOR B/A_XNOR_B" and replace with

--A_XOR_B/A_XNOR_B--.

Line 57, delete "riot" and replace with --not--.

Signed and Sealed this

Seventeenth Day of April, 2007

JON W. DUDAS
*Director of the United States Patent and Trademark Office*